(12) United States Patent
Kim et al.

(10) Patent No.: US 9,894,191 B2
(45) Date of Patent: Feb. 13, 2018

(54) MOBILE TERMINAL

(71) Applicant: LG ELECTRONICS INC., Seoul (KR)

(72) Inventors: Sungpil Kim, Seoul (KR); Hosung Nam, Seoul (KR); Minho Park, Seoul (KR); Jaeyoung Han, Seoul (KR); Kwanghyun Ahn, Seoul (KR); Joonho Huh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/311,102

(22) PCT Filed: Nov. 24, 2014

(86) PCT No.: PCT/KR2014/011315
§ 371 (c)(1),
(2) Date: Nov. 14, 2016

(87) PCT Pub. No.: WO2015/194716
PCT Pub. Date: Dec. 23, 2015

(65) Prior Publication Data
US 2017/0078461 A1 Mar. 16, 2017

(30) Foreign Application Priority Data
Jun. 16, 2014 (KR) .................. 10-2014-0072756
Jun. 24, 2014 (KR) .................. 10-2014-0077596

(51) Int. Cl.
H04M 1/02 (2006.01)
H04B 1/38 (2015.01)
H04M 1/18 (2006.01)

(52) U.S. Cl.
CPC ............ H04M 1/0266 (2013.01); H04B 1/38 (2013.01); H04M 1/026 (2013.01);
(Continued)

(58) Field of Classification Search
CPC ..................... H04B 2001/3894; H04M 1/0249
See application file for complete search history.

(56) References Cited

U.S. PATENT DOCUMENTS 4,581,654 A * 4/1986 Kobayashi ............. H04N 3/127
348/790
9,042,095 B2 * 5/2015 Song ..................... G06F 1/1626
361/679.21

(Continued)

FOREIGN PATENT DOCUMENTS

KR 10-2006-0057466 A 5/2006
KR 10-2013-0002683 A 1/2013
(Continued)

Primary Examiner — Cindy Trandai
(74) Attorney, Agent, or Firm — Birch, Stewart, Kolasch & Birch, LLP

(57) ABSTRACT

A mobile terminal comprises: a case having an electric mounting portion with electronic components installed therein and having an ear jack holder part on the outer surface thereof; and ear jack connected to the ear jack holder part and having a plug hole into which a connecting plug is inserted; a plurality of first terminals equipped inside the plug hole; a second terminal connected to the first terminal and exposed to the outside of the ear jack; an antenna carrier connected to the back side of the case and having an antenna pattern formed on the surface thereof; and an ear jack electrode pattern formed in the antenna carrier, one end thereof being connected to the second terminal, wherein the mobile terminal has an ear jack structure outside the case, and thereby can prevent water from flowing into the mobile terminal through the ear jack.

16 Claims, 19 Drawing Sheets

(52) U.S. Cl.
CPC ....... *H04M 1/0262* (2013.01); *H04M 1/0274* (2013.01); *H04M 1/18* (2013.01)

(56) References Cited

U.S. PATENT DOCUMENTS

| | | | | |
|---|---|---|---|---|
| 9,323,292 | B2* | 4/2016 | Bae | H04M 1/18 |
| 2001/0004397 | A1* | 6/2001 | Kita | G04G 21/00 |
| | | | | 381/334 |
| 2005/0128151 | A1* | 6/2005 | Kwak | H01Q 1/243 |
| | | | | 343/702 |
| 2005/0253758 | A1* | 11/2005 | Il | H01Q 1/243 |
| | | | | 343/702 |
| 2006/0258325 | A1* | 11/2006 | Tsutaichi | H04M 1/18 |
| | | | | 455/350 |
| 2007/0130605 | A1* | 6/2007 | Chung | H04H 20/57 |
| | | | | 725/131 |
| 2007/0139271 | A1* | 6/2007 | Pelzer | H01Q 1/243 |
| | | | | 343/700 MS |
| 2007/0164912 | A1* | 7/2007 | Yanagi | H01Q 1/273 |
| | | | | 343/702 |
| 2011/0068665 | A1 | 3/2011 | Cao | |
| 2011/0068985 | A1* | 3/2011 | Hillersborg | H01Q 1/244 |
| | | | | 343/702 |
| 2011/0211300 | A1* | 9/2011 | Mori | G06F 1/1656 |
| | | | | 361/679.01 |
| 2012/0236512 | A1 | 9/2012 | Liu et al. | |
| 2013/0093640 | A1* | 4/2013 | Kwon | H01Q 1/243 |
| | | | | 343/841 |
| 2013/0242481 | A1* | 9/2013 | Kim | H05K 5/06 |
| | | | | 361/679.01 |
| 2014/0031093 | A1* | 1/2014 | Song | H04B 1/3888 |
| | | | | 455/575.1 |
| 2014/0104795 | A1* | 4/2014 | Wee | H05K 7/14 |
| | | | | 361/752 |
| 2014/0191638 | A1* | 7/2014 | Nakao | H04M 1/0262 |
| | | | | 312/229 |
| 2014/0246339 | A1* | 9/2014 | Chung | H04B 1/3888 |
| | | | | 206/37 |
| 2014/0262847 | A1* | 9/2014 | Yang | A45C 11/00 |
| | | | | 206/37 |
| 2014/0266922 | A1* | 9/2014 | Jin | H01Q 21/28 |
| | | | | 343/702 |
| 2014/0306857 | A1* | 10/2014 | Bevelacqua | H01Q 1/243 |
| | | | | 343/750 |
| 2014/0362544 | A1* | 12/2014 | Han | G04G 17/06 |
| | | | | 361/749 |
| 2015/0014213 | A1* | 1/2015 | Merenda | B65H 75/48 |
| | | | | 206/581 |
| 2015/0181338 | A1* | 6/2015 | Hosoi | H04R 5/033 |
| | | | | 381/309 |
| 2015/0276275 | A1* | 10/2015 | Chen | H01L 35/32 |
| | | | | 62/3.7 |
| 2015/0365508 | A1* | 12/2015 | Kwon | H04B 1/3888 |
| | | | | 455/566 |
| 2016/0124396 | A1* | 5/2016 | Choi | G04R 60/10 |
| | | | | 368/281 |

FOREIGN PATENT DOCUMENTS

| | | |
|---|---|---|
| KR | 10-2013-0066918 A | 6/2013 |
| KR | 10-2014-0013846 A | 2/2014 |
| KR | 10-2014-0052481 A | 5/2014 |

* cited by examiner

FIG. 19
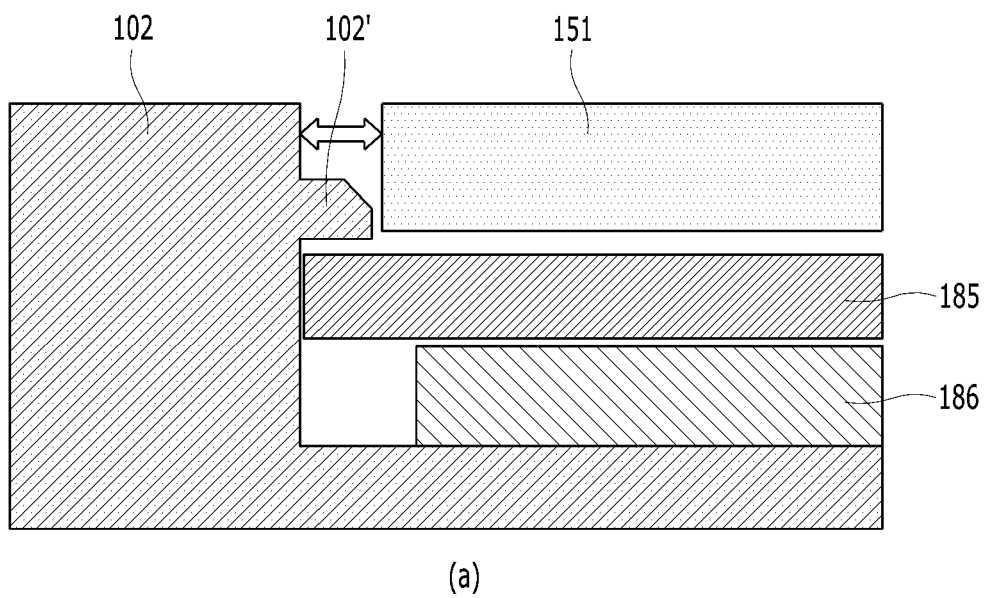
(a)
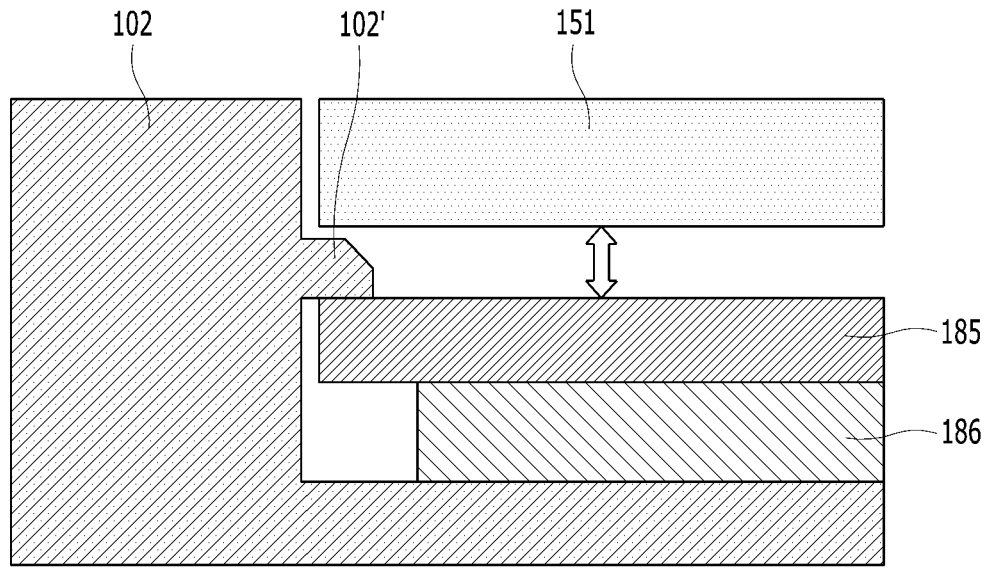
(b)

MOBILE TERMINAL

CROSS REFERENCE TO RELATED APPLICATIONS

This application is the National Phase of PCT International Application No. PCT/KR2014/011315, filed on Nov. 24, 2014, which claims priority under 35 U.S.C. 119(a) to Patent Application No. 10-2014-0072756, filed in Republic of Korea on Jun. 16, 2014, and to Patent Application No. 10-2014-0077596, filed in Republic of Korea on Jun. 24, 2014, all of which are hereby expressly incorporated by reference into the present application.

TECHNICAL FIELD

The present invention related to a mobile terminal having a waterproof function.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

With the diversified functions of the mobile terminal, the mobile terminal has been widely used and its usage frequency has been increased in an environment where water exists, such as bathroom or swimming pool. For waterproof of the mobile terminal, a plastic bag may be used or an accessory should additionally be provided. If the mobile terminal is covered with a plastic bag, its function is limited, whereby a mobile terminal having a waterproof function has been required.

DISCLOSURE

Technical Problem

An object of the present invention is to provide a mobile terminal having a waterproof structure simplified by modulating an ear jack and adding a hook structure to a main board.

Technical Solution

To achieve the above objects, according one aspect of the present invention, a mobile terminal comprises a case having an electric mounting portion with electronic components packaged therein and having an ear jack holder on the outer surface thereof; an ear jack coupled to the ear jack holder, having a plug hole into which a connection plug is inserted; a plurality of first terminals provided inside the plug hole; a second terminal connected to the first terminals and exposed to the outside of the ear jack; an antenna carrier coupled to a rear surface of the case, having an antenna pattern formed on the surface thereof; and an ear jack electrode pattern formed in the antenna carrier, having one end which is in contact with the second terminal.

The second terminal of the ear jack may be located in a side direction of the ear jack, the antenna carrier may further include an ear jack rib protruded from an inner side thereof, passing through the opening, and one end of the ear jack electrode pattern may be formed at the ear jack rib and may be in contact with the second terminal.

The mobile terminal may further comprise a waterproof tape interposed between the antenna carrier and the case.

The mobile terminal may further comprise a connection rib protruded from the inner side of the antenna carrier and extended to a main board, which is located inside the case, by passing through the case, and the ear jack electrode pattern may be extended to the connection rib and electrically connected with the main board.

The antenna pattern and the ear jack electrode pattern may be formed at the inner side of the antenna carrier.

The ear jack holder may further include an ear jack fixing portion partially covering a rear surface of the ear jack.

The antenna carrier may include an ear jack hole for exposing the plug hole of the ear jack.

In another aspect of the present invention, a mobile terminal comprises a case including a packaging portion recessed in a rear direction on a front surface; a fastening protrusion protruded from a side of the packaging portion toward an inner direction; a main board coupled to the front surface of the case; a hook coupled to a circumference of a rear surface of the main board and protruded from a side end of the main board; and a display unit arranged on a front surface of the main board and coupled to a circumference of the case, wherein the hook couples the main board with the case in contact with a rear surface of the fastening protrusion.

The hook may be fastened to the main board by a manner of surface mounter technology (SMT).

The hook may include a seating portion which is in contact with the circumference of the rear surface of the main board; a fastening portion extended from the seating portion to a front direction and inserted to the main board; and a protrusion extended from the seating portion toward a side direction of the main board and protruded from the main board.

The protrusion may be a U shaped metal plate material extended from the seating portion toward a rear direction, having an end folded toward a front surface.

The protrusion may be formed at a height different from that of the rear surface of the main board.

The hook may be formed by folding a cross shaped metal plate material.

The main board may include a recess inserted from a side end at a width corresponding to that of the fastening protrusion at a position corresponding to the hook, and the fastening protrusion may be inserted to the recess and may be fastened to the hook.

The mobile terminal may further comprise a battery packaged in a rear surface of the case, and a rear cover covering the battery, coupled to the rear surface of the case.

The mobile terminal may further comprise a waterproof sealing formed on a circumference of the rear surface of the case, constituting a closed curved surface.

Advantageous Effects

According to one embodiment of the present invention, an ear jack structure is provided outside a case, whereby water may be prevented from being permeated through the ear jack.

Also, a waterproof ear jack may be used, or an existing antenna carrier may be used without a separate sealing member for waterproof of the ear jack, whereby the cost may be reduced.

Also, since a fastening structure based on a screw may be omitted as a hook structure is used, the cost may be reduced and additional waterproof member may not be required additionally in view of waterproof.

Also, a front case is omitted, and a front surface is provided by a display unit and a cover glass only, whereby the number of members can be reduced and a thickness of the product can be reduced.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 19 is a cross-sectional view illustrating a mobile terminal of the related art.

BEST MODE FOR CARRYING OUT THE INVENTION

Figure 1:
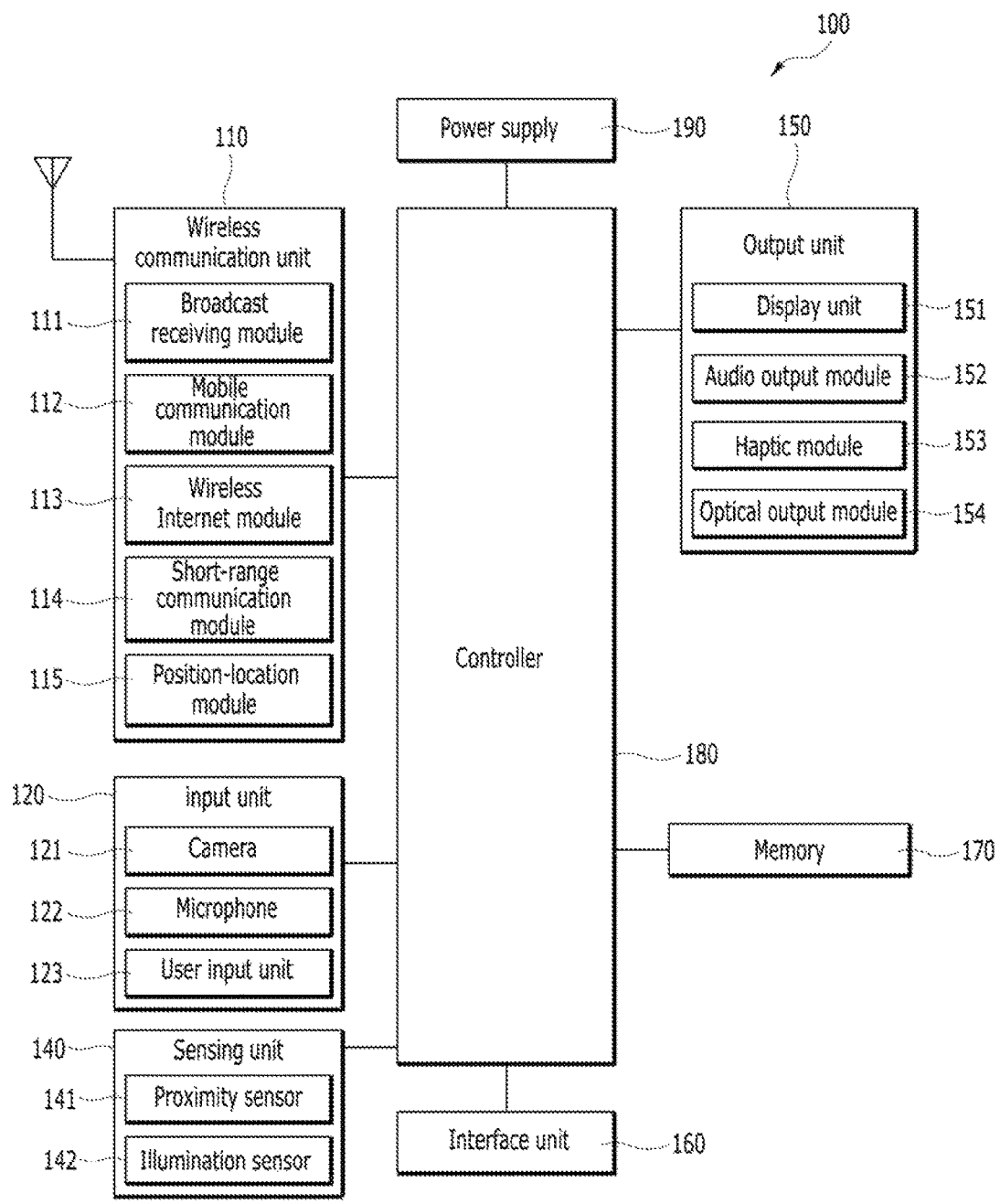
FIG. 1 is a block diagram of a mobile terminal in accordance with the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 2:
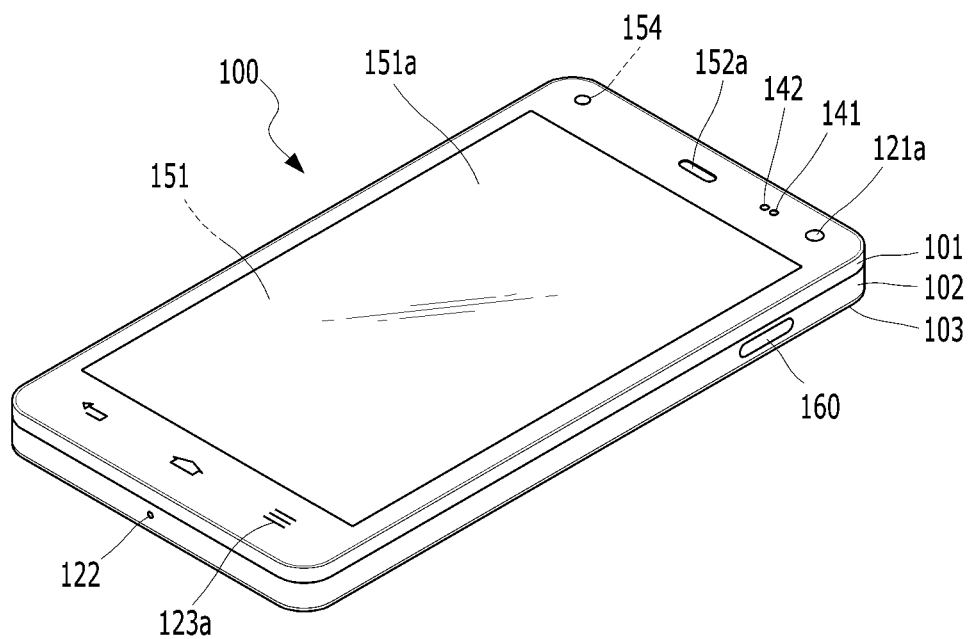
FIGS. 2 and 3 are conceptual views of one example of the mobile terminal, viewed from different directions.
Figure 3:
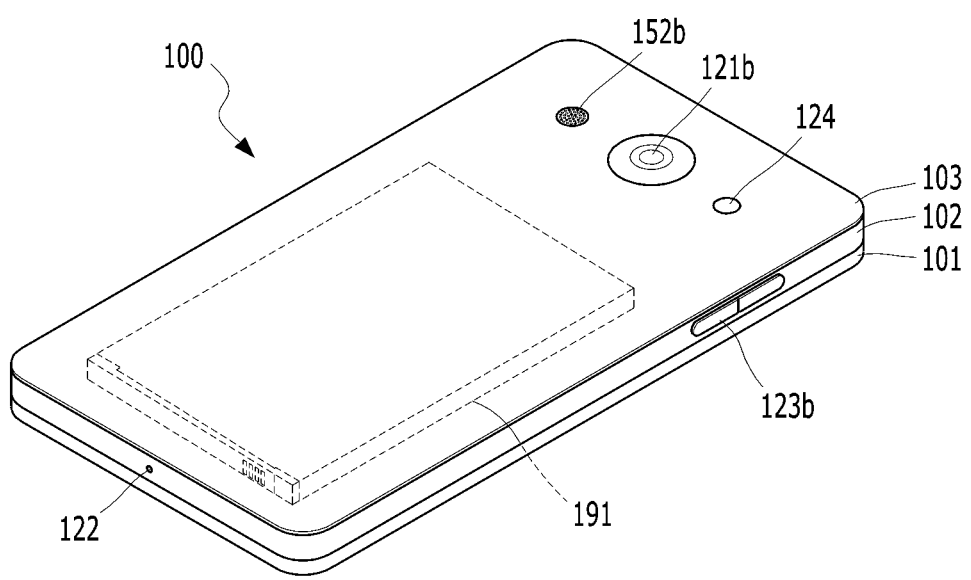

Reference is now made to FIGS. 1-3, where FIG. 1 is a block diagram of a mobile terminal in accordance with the present disclosure, and FIGS. 2 and 3 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1 is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example—the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1-3 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Referring now to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 2 and 3. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented as a receiver that transfers a call sound to an ear of a user, and the second audio output module 152b may be implemented as a loud speaker that outputs various alarm sounds or a play sound of multimedia.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be movable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 3, a flash 124 is shown adjacent to the second camera 121b. When an image of a subject is captured with the camera 121b, the flash 124 may illuminate the subject.

As shown in FIG. 2, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1), may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

Figure 4:
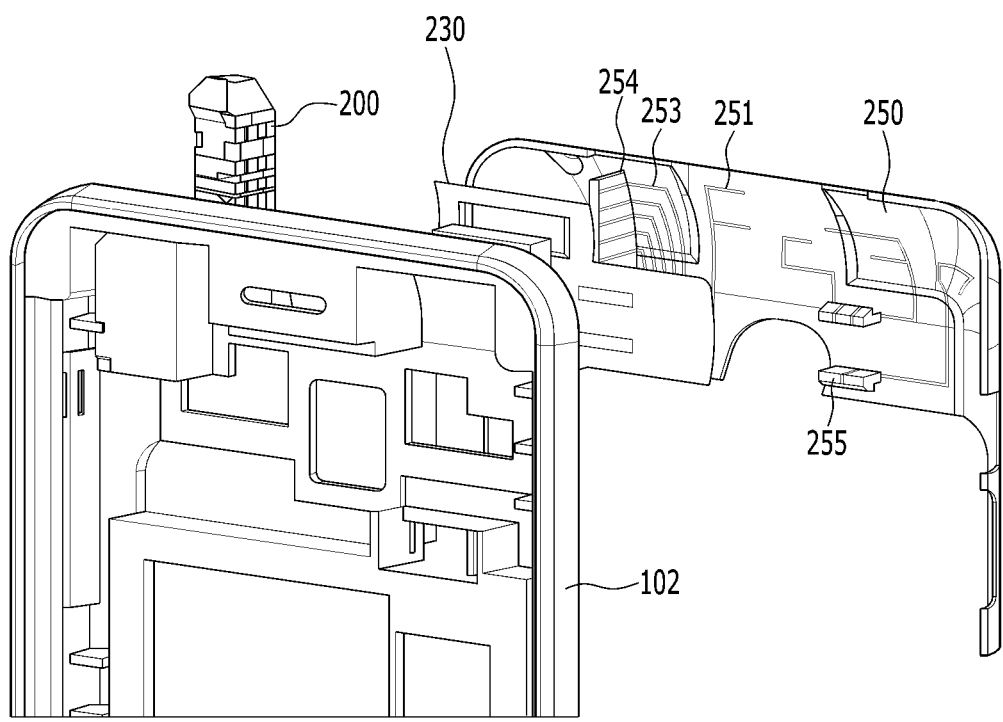
FIGS. 4 and 5 are views illustrating a rear case and an antenna carrier of the mobile terminal related to one embodiment of the present invention.
Figure 5:
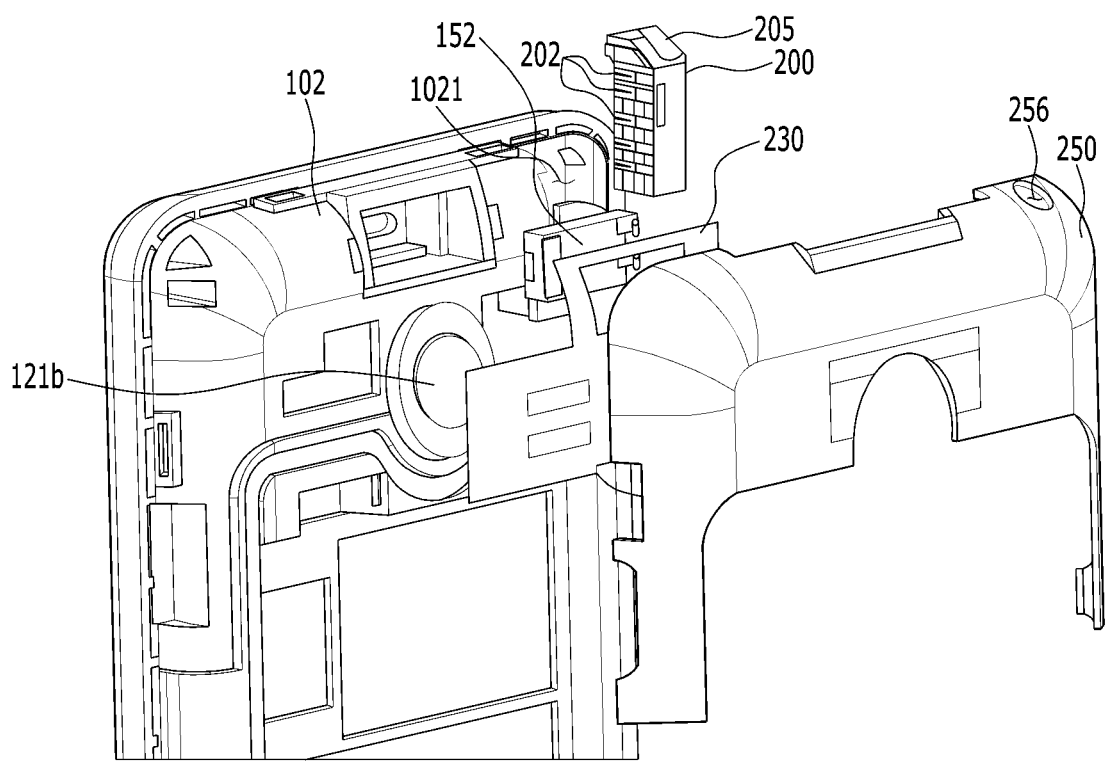

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen FIGS. 4 and 5 are views illustrating a rear case 102 and an antenna carrier 250 of the mobile terminal related to the present invention. The audio output module 152 is provided on a front surface or a rear surface of the mobile terminal as shown in FIGS. 2 and 3 to output a sound, and an auxiliary output device such as an earphone, a headset, and a speaker may be used the audio output module 152 to enhance an audio output function. An ear jack 200 having 4 or 5 electrodes may be provided to connect the auxiliary output device with the mobile terminal.

The ear jack 200 includes a plug hole 205 for insertion of a plug. The plug inserted to the plug hole 205 is provided with a plurality of connection rings formed in a pin shape. The respective connection rings are spaced apart from each other, and a first terminal 201 connected to the connection rings is formed at the inner side of the plug hole 205. The first terminal 201 is extended to the outside of the ear jack 200 and connected to a second terminal 202 located at a side of the ear jack 200 as shown in FIG. 4.

The first terminal 201 and the second terminal 202 may be formed by bending one plate shaped member, and may be inserted to the ear jack 200 provided with openings or may be formed by a double ejection mode with the ear jack 200.

The plurality of first terminals 201 formed in the ear jack 200 may perform their respective independent functions such as transferring left and right audio sounds and converting a sound input from the microphone provided in the ear set to a signal. Recently, as a length of the plug is increased and the number of connection rings is increased, various accessories such as IR remote controller in addition to earphone or speaker may be attached to the ear jack 200.

Figure 6:
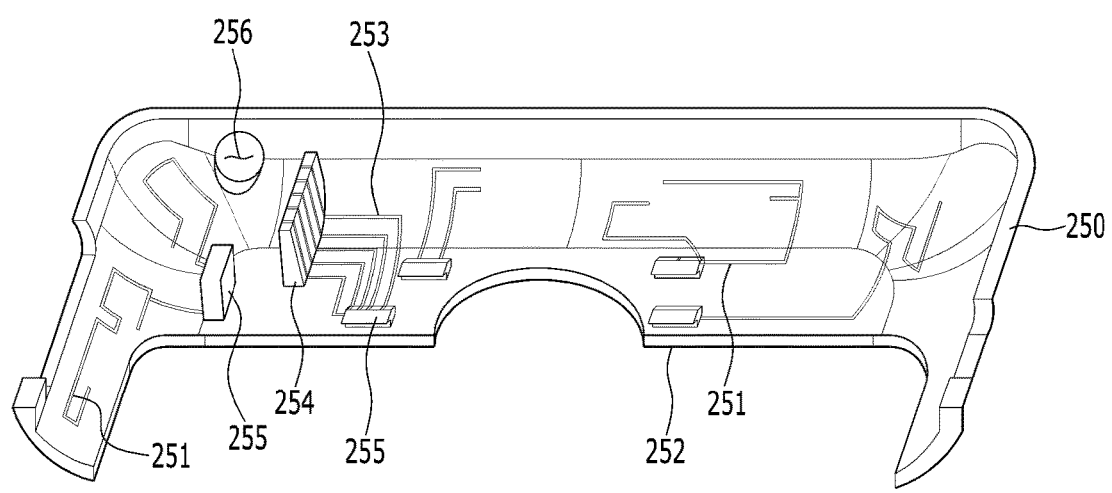
FIG. 6 is a view illustrating a state that an ear jack related to one embodiment of the present invention is mounted on a rear case.

FIG. 6 is a view illustrating a state that an ear jack 200 is coupled to an ear jack holder 1021. The ear jack 200 is coupled to the ear jack holder 1021 formed on a rear surface of the rear case 102. The ear jack holder 1021 is formed to be recessed in a shape corresponding to a shape of the ear jack 200 in a front direction from the rear surface of the rear case 102.

The ear jack 200 of the related art is located at the inner side of the case 102, whereas the ear jack 200 of the present invention is located outside an electric mounting portion as the ear jack holder 1021 is formed outside the case 102.

The ear jack holder 1021 may further include an ear jack fixing portion fixing portion 1023 to prevent the ear jack 200 from being detached from the ear jack holder 1021. The ear jack fixing portion 1023 covers the rear surface of the ear jack 200, and the ear jack 200 may be fixed between the ear jack fixing module 1023 and the ear jack holder 1021.

Since the ear jack holder 1021 is detached from the electric mounting portion, water permeated into the ear jack 200 through the plug hole 205 of the ear jack 200 may be prevented from being permeated into the electric mounting portion. However, it is required to connect the ear jack 200 located outside the case 102 with the main board 185 provided in the electric mounting portion at the inner side. According to the related art, a flexible printed circuit board has been used to connect the second terminal 202 of the ear jack 200 with the main board 185, and an opening of the case 102, through which the flexible printed circuit board passes, has been sealed by a sealing member.

However, in the related art as above, the flexible printed circuit board and the sealing member are additionally required, whereby a problem occurs in that the cost and the process may be increased. In this respect, in the present invention, the antenna carrier 250 is used to connect the ear jack 200 with the main board 185 provided in the electric mounting portion of the mobile terminal.

Figure 7:
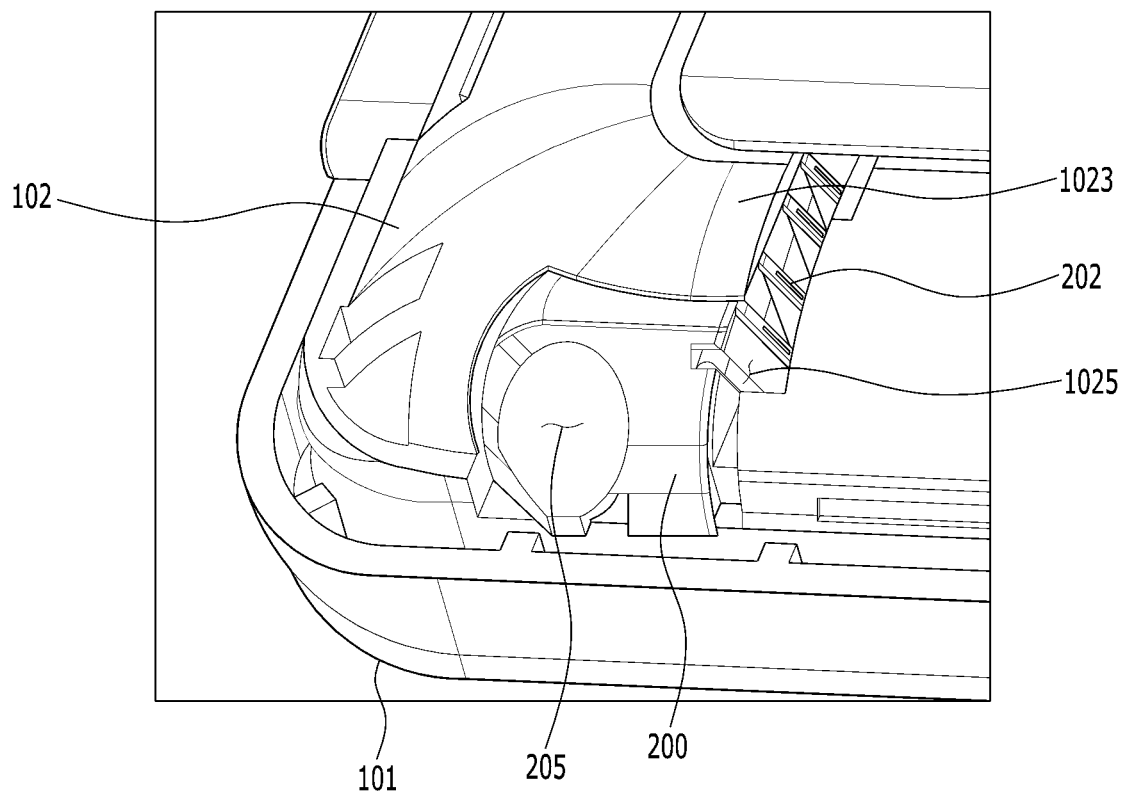
FIG. 7 is a view illustrating an antenna pattern and an ear jack electrode pattern formed in an antenna carrier related to one embodiment of the present invention.

FIG. 7 is a view illustrating an antenna pattern 251 and an ear jack connection pattern 253 formed in the antenna carrier 250. The antenna carrier 250 is a device for packaging an antenna in the mobile terminal in such a manner that the antenna pattern 251 is formed on a surface and coupled to the case 102. The antenna carrier 250 may minimize interference with other electronic components, which is caused when the antenna carrier is directly arranged in the electric mounting portion. If the antenna carrier 250 is used, an antenna may be formed outside the mobile terminal, whereby a transmission and reception rate of an electromagnetic wave signal may be enhanced.

Figure 8:
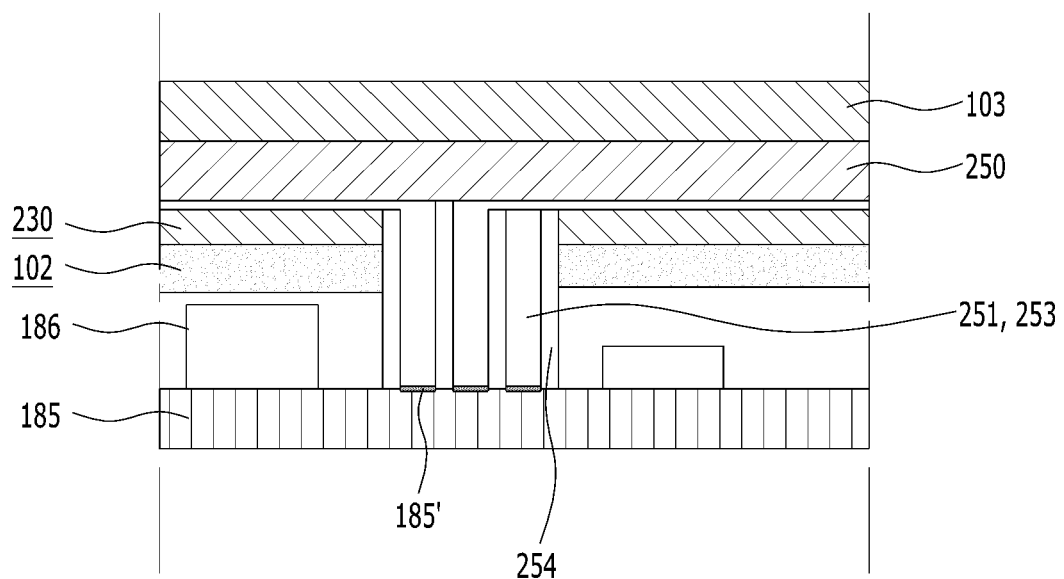
FIG. 8 is a view illustrating a connection rib of an antenna carrier related to one embodiment of the present invention.

FIG. 8 is a view illustrating a connection portion of an antenna carrier 250. Since the antenna carrier 250 is connected to the main board 185 of the mobile terminal to receive a signal which will be transmitted and transfer the received signal, the antenna carrier 250 includes a connection portion connected with the main board 185. The connection portion includes a connection rib 255 protruded from the inner side of the antenna carrier 250 of the mobile terminal and a connection terminal formed in the connection rib 255. The connection portion is connected with the main board 185 by passing through the case 102 of the mobile terminal.

A waterproof tape 230 is interposed between the case 102 and the antenna carrier 250 to couple these two members with each other, and may prevent water from being permeated between the case 102 and the antenna carrier 250. As shown in FIG. 4d, the waterproof tape 230 is located around the connection rib 255 to prevent water from being permeated into the opening of the case 102 to which the connection rib 255 is inserted.

In the present invention, in addition to the antenna carrier 250 provided with an antenna on a surface and connected with the main board 185, an ear jack connection pattern 253 connecting the ear jack 200 with the main board 185 is further formed to electrically connect the ear jack 200 with the main board 185. One end of the ear jack connection pattern 253 is in contact with the second terminal 202, and the other end thereof is extended to the electric mounting portion of the mobile terminal through the connection rib 255 and connected with the main board 185.

Figure 9:
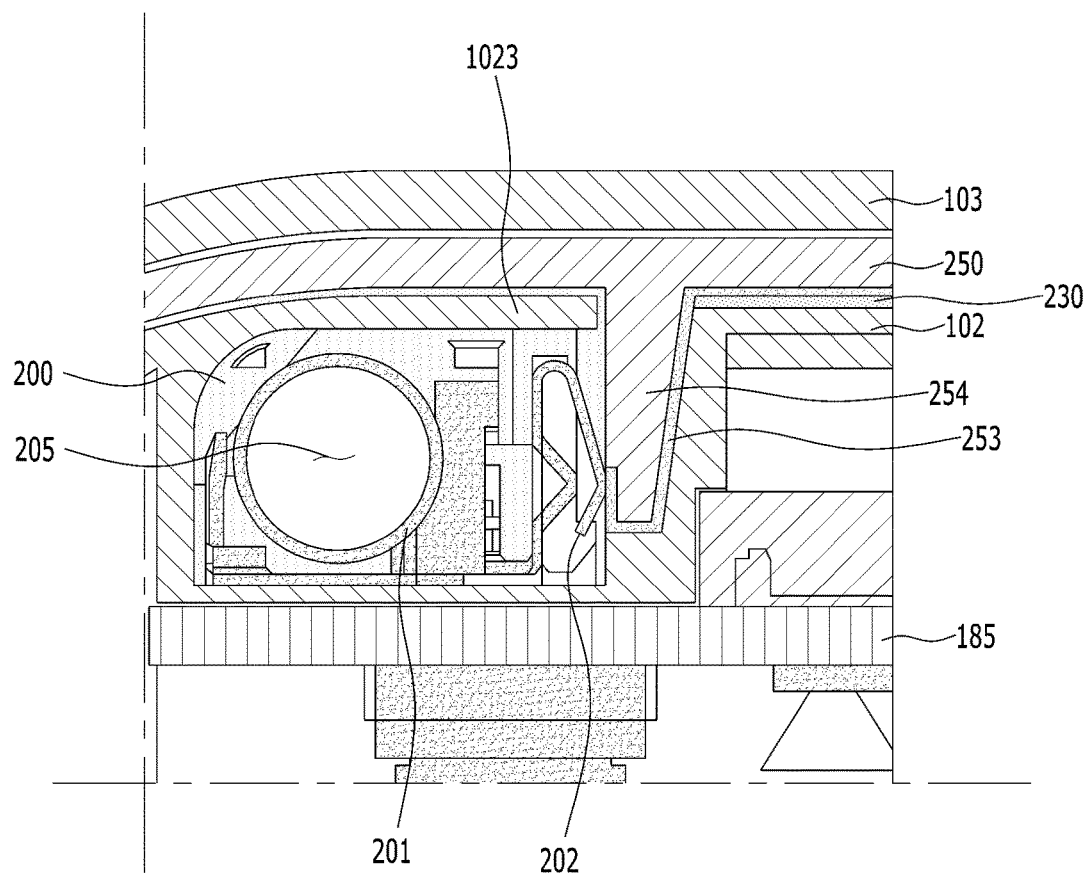
FIG. 9 is a view illustrating a cross-section of an ear jack related to one embodiment of the present invention.

FIG. 9 is a view illustrating a cross-section of an ear jack 200 related to one embodiment of the present invention. The ear jack 200 may further include an ear jack rib 254 to connect the second terminal 202 located at the side of the ear jack 200 with the ear jack connection pattern 253, and may further include a rib insertion module 1025 at the side of the second terminal 202 of the ear jack holder 1021, whereby the ear jack rib 254 may be inserted to the rib insertion module 1025.

The ear jack rib 254 is protruded from the antenna carrier 250 at a position which is in contact with the second terminal 202 of the ear jack 200 to connect one end of the ear jack connection pattern 253 with the second terminal 202 located at the side of the ear jack 200. One end of the ear jack connection pattern 253 is located at the position where the ear jack rib 254 is in contact with the second terminal 202 of the ear jack 200, and the other end of the ear jack connection pattern 253 is connected with the main board 185 through the connection rib 255 as the ear jack connection pattern 253 is extended from the ear jack rib 254.

If the second terminal 202 of the ear jack 200 is positioned toward the antenna carrier 250, the ear jack connection pattern 253 may directly be connected with the second terminal 202 without the ear jack rib 254. However, since a side direction (horizontal direction in FIG. 9) of the ear jack rib 254 is thicker than a thickness direction (vertical direction in FIG. 9), wherein the second terminal 202 is located in the side direction, if the ear jack rib 254 is used after the second terminal 202 is arranged toward the side as shown in FIG. 9, the thickness of the ear jack rib 254 can be reduced.

Also, as shown in FIG. 5, the antenna carrier 250 may prevent the ear jack 200 exposed to a rear direction of the rear case 102 from being outwardly exposed by covering the rear surface of the rear case 102, and may include an ear jack hole 256 for exposing the plug hole 205, at the position corresponding to the plug hole 205 of the ear jack 200.

Figure 10:
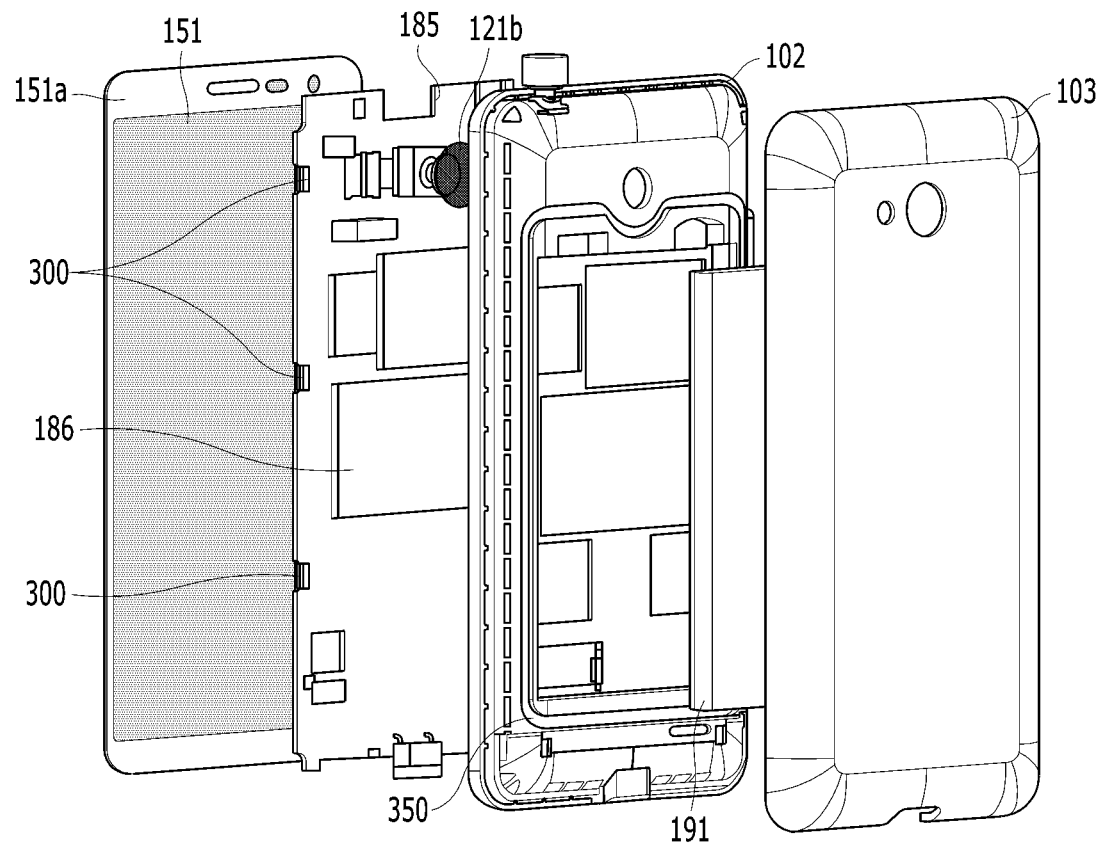
FIG. 10 is an exploded perspective view illustrating the mobile terminal related to the present invention.

FIG. 10 is an exploded perspective view illustrating the mobile terminal 100 related to the present invention. The mobile terminal 100 of the present invention has a structure that the case 102, the main board 185 and the display unit 141 are deposited. If a component such as a battery is packaged on the rear surface of the case 102, the mobile terminal 100 may further include a rear cover 103.

The case 102 constitutes a rear surface of the mobile terminal 100 and includes a packaging portion for packaging an electronic component 186 including the main board 185 on a front surface thereof. The packaging portion is comprised of a space inserted from the front surface toward a rear direction and surrounded by a side. The display unit 151 is coupled to the front surface of the main board 185, and a window glass, which covers the display unit 151 and constitutes the front surface of the mobile terminal 100, is coupled to the front surface of the main board 185.

The window glass 151a and the display unit 151 may be formed in a single body, or may be coupled to each other by using a transparent adhesive. The window glass 151a is formed to be greater than the display unit 151 to cover the camera, the receiver, etc., which are located above or below the display unit 151, as well as the display unit 151.

The outside portion is in contact with the circumference of the front surface of the case 102, and may be coupled to the case 102 by using an adhesive tape 107, etc. A waterproof tape may be used as the adhesive tape 107 to prevent external moisture from being permeated into the case 102.

In this embodiment, the front case 102 is omitted, and an electric mounting portion in which various components are packaged is implemented using the main board 185 and the case 102 constituting the rear surface of the mobile terminal 100.

If a screw is used to fix the components including the main board 185 which are packaged between the display unit 151 and the case 102 to the case 102 of the mobile terminal 100, the number of components and the number of processes may be added, whereby the cost may be increased. Since the case should be punctured for screw fastening, if a fastening structure such as a screw is used, moisture may externally be permeated into the case, whereby the electronic component 186 may be damaged.

Therefore, in the present invention, an uneven portion may be formed instead of the screw, whereby a fastening process using the screw may be omitted. Also, a hole formed in the case 102 may be minimized to prevent external moisture from being permeated into the case 102.

As the main board 185 is fastened to a rear direction of a fastening protrusion 102' protruded from the side of the packaging portion to the inner side, the display unit 151 may be fixed. At this time, in the present invention, a hook 300 may be added to the main board 185, whereby the hook 300 is coupled to the fastening protrusion 102'.

Figure 12:
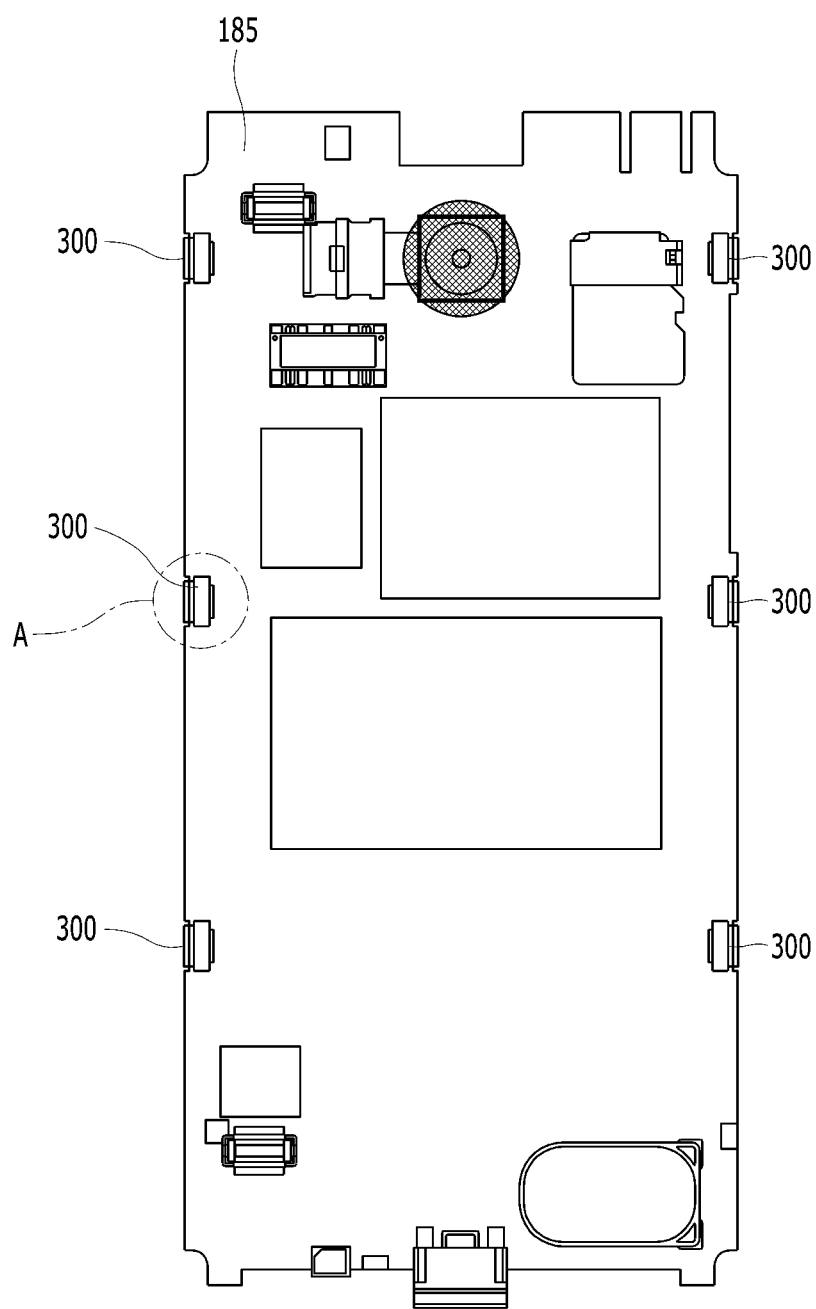
FIG. 12 is a plane view illustrating a main board of the mobile terminal related to the present invention.
Figure 13:
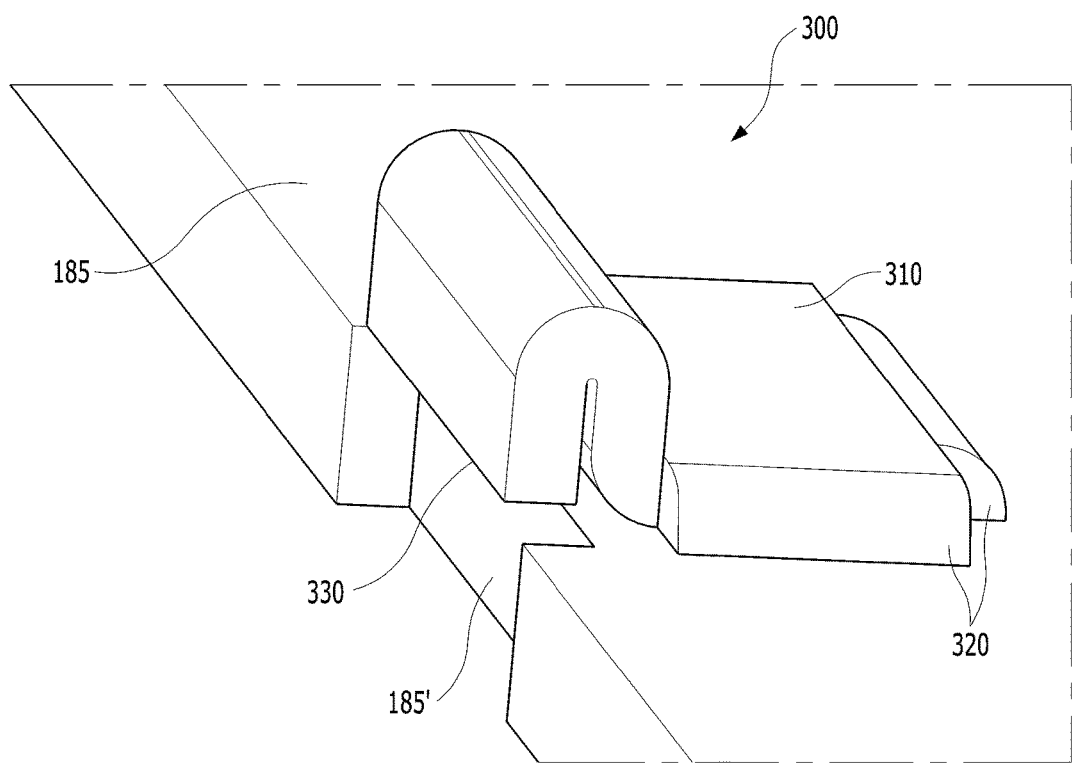
FIGS. 13 and 14 are perspective views illustrating a hook of the mobile terminal related to the present invention.
Figure 14:
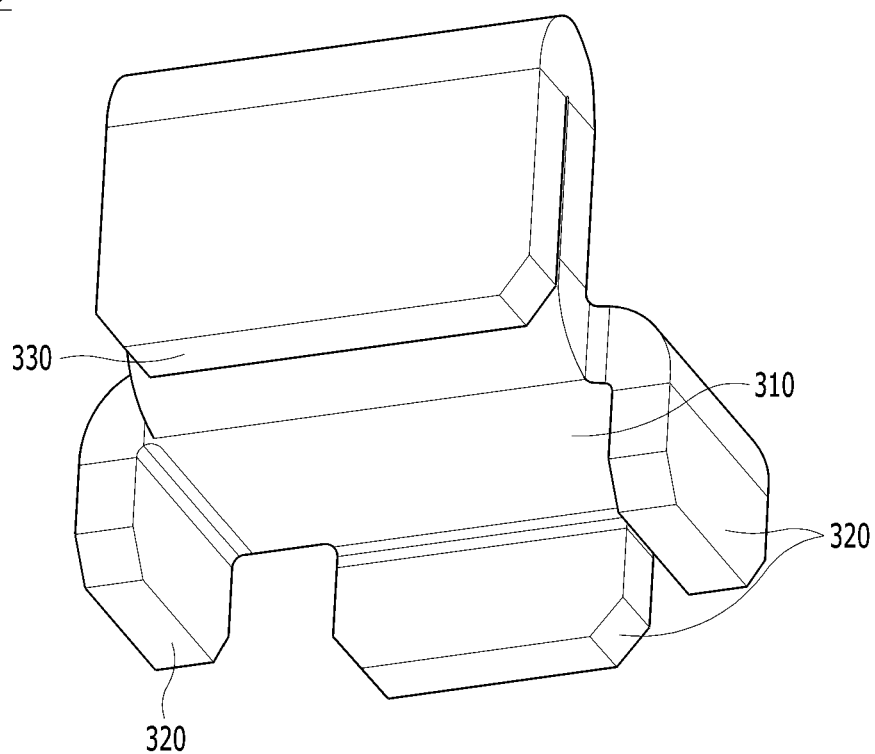

FIG. 12 is a plane view illustrating a main board 185 of the mobile terminal 100 related to the present invention, and FIGS. 13 and 14 are perspective views illustrating a hook 300 of the mobile terminal 100 related to the present invention. The hook 300 is coupled to the circumference of the rear surface of the main board 185 and protruded in a side direction of the main board 185.

A method for coupling the main board 185 to the fastening protrusion 102' without the hook 300 has problems in that a spaced portion is formed between the display unit 151 and the case 102 and bezel is increased if the display unit 151 and the fastening protrusion 102' are arranged in parallel as shown in (a) of FIG. 19. Alternatively, as shown in (b) of FIG. 19, if the display unit 151 is arranged on the fastening protrusion, a problem occurs in that a spaced portion corresponding to a thickness of the fastening protrusion 102' is generated to increase the thickness of the mobile terminal 100.

Figure 11:
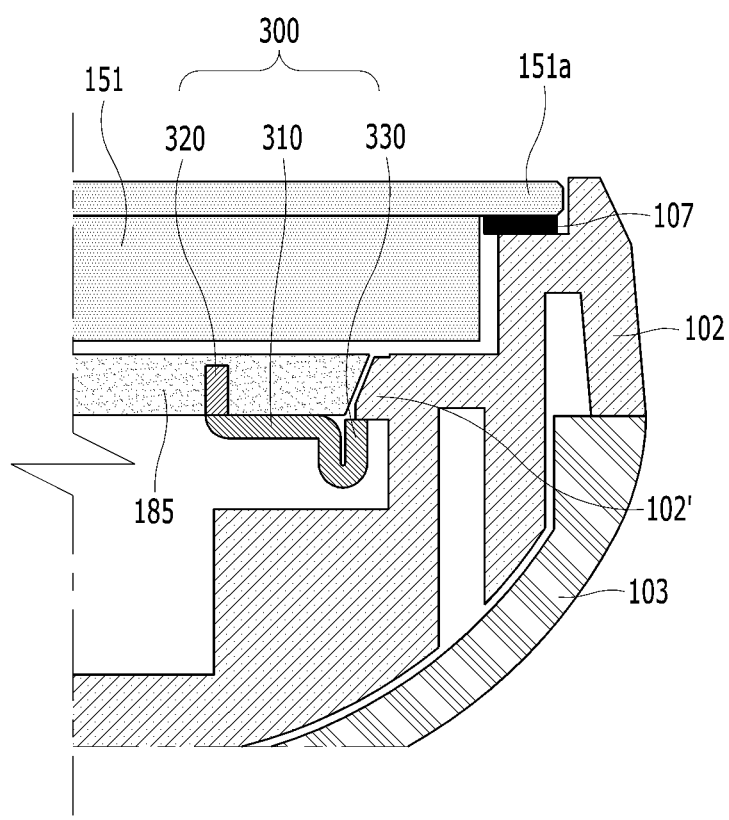
FIG. 11 is a cross-section view illustrating the mobile terminal related to the present invention.

If the hook 300 is used, since the fastening protrusion 102' and the main board 185 may be arranged in parallel at the same height as shown in FIG. 11, thickness increase or bezel increase may be avoided. Since the fastening protrusion 102' may be arranged in a rear direction of the display unit 151, bezel increase in a side direction may be avoided.

A plurality of the hooks 300 may be provided to surround the rear surface of the main board 185 as shown in FIG. 12, and are not required to be necessarily formed symmetrically or at constant intervals. The position of the hooks 300 may be determined considering arrangement of components inside the mobile terminal 100.

The hook 300 is coupled to the main board 185 by a seating portion 310 which is in contact with the main board 185 and a fastening portion 320 extended from the seating portion 310 in a front direction and inserted into the main board 185. The fastening portion 320 may be coupled to the main board 185 in a manner of surface mounter technology (SMT). The SMT manner is to fix the fastening portion 320 to the main board 185 by means of soldering. If the SMT manner is used, the hook 300 may be coupled to the main board 185 during a process of packaging an electronic integrated chip (IC) in the main board 185 without a separate process for packaging the hook 300.

The hook 300 includes a protrusion 330 protruded from the seating portion 310 toward a side direction at a side end of the main board 185, and the protrusion 330 is in contact with the fastening protrusion 102' to support the main board 185 so as not to be detached from the case 102. Particularly, as shown in FIGS. 13 and 14, if the protrusion 330 is formed to be extended from the seating portion 310 toward a rear direction and formed in a U shape to allow its end to be folded toward the front surface, a support force applied toward a rear direction is improved. The hook 300 may be manufactured as shown in FIG. 14 by folding a cross shaped metal plate.

Figure 15:
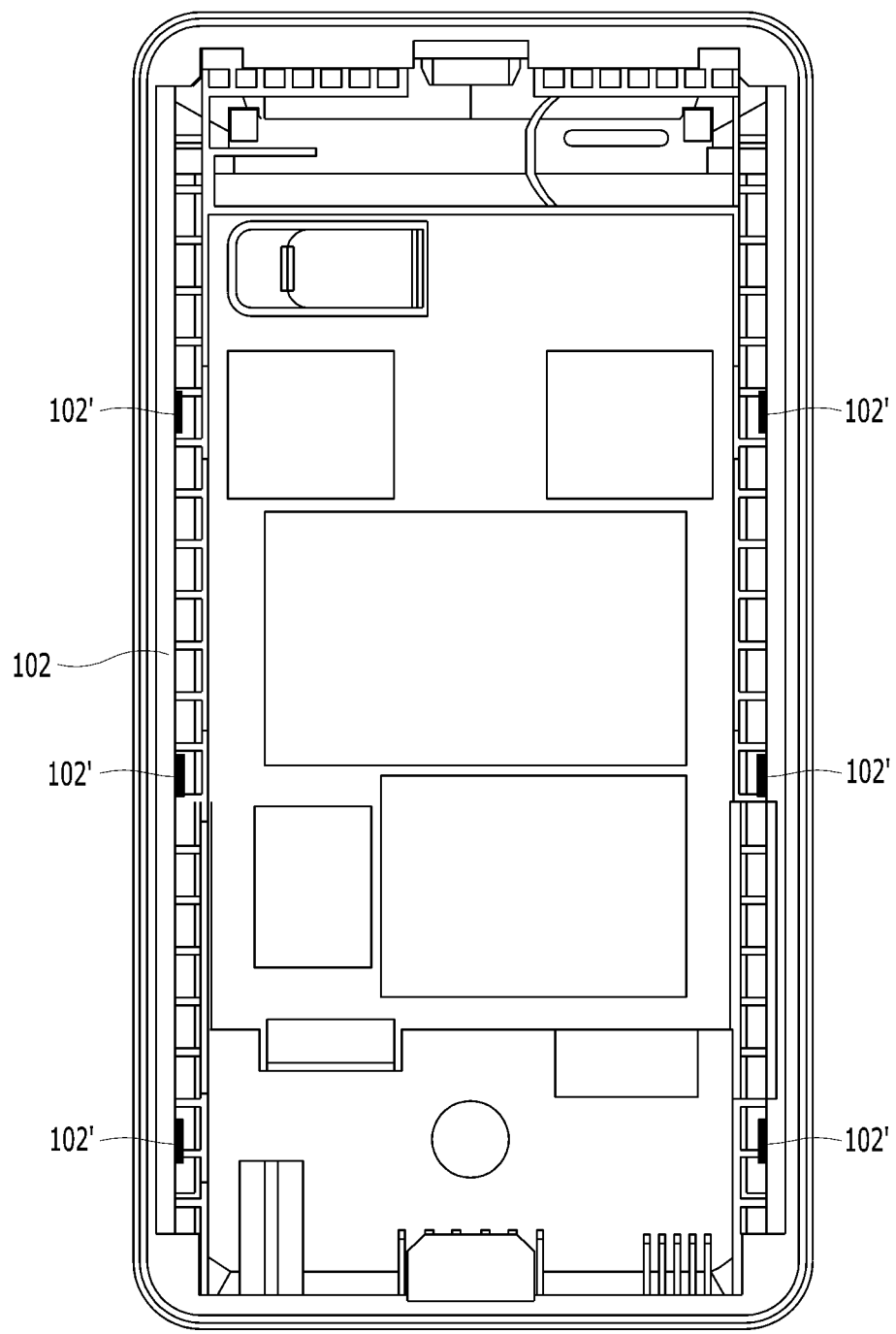
FIG. 15 is a plane view illustrating a case of the mobile terminal related to the present invention.
Figure 16:
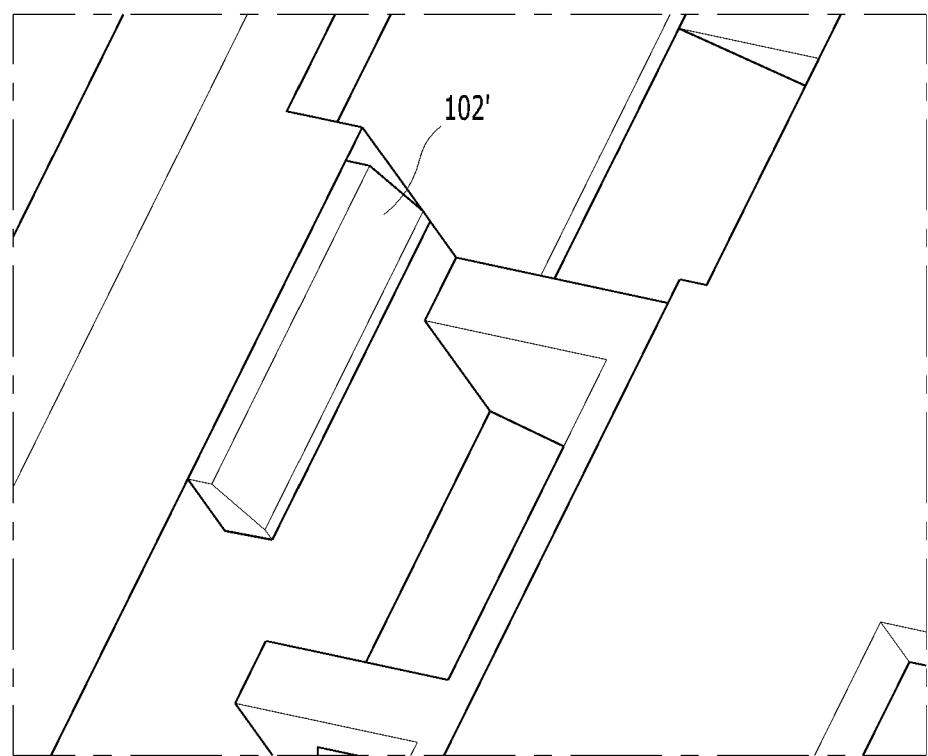
FIG. 16 is a perspective view illustrating a fastening protrusion of the mobile terminal related to the present invention.

FIG. 15 is a plane view illustrating a case 102 of the mobile terminal 100 related to the present invention, and FIG. 16 is a perspective view illustrating a fastening protrusion 102' of the mobile terminal 100 related to the present invention. The fastening protrusion 102' is formed at the position corresponding to the position where the hook 300 is formed, and forms a flat surface toward a rear direction as shown in FIG. 16.

As shown in FIG. 13, a recess 151' of a shape corresponding to the fastening protrusion 102' may be provided in the main board 185. The recess 151' has a width corresponding to that of the fastening protrusion 102', and the fastening protrusion 102' is inserted to the recess 151', whereby a spaced portion spaced by the fastening protrusion 102' in a side direction of the main board 185 may be minimized.

Figure 17:
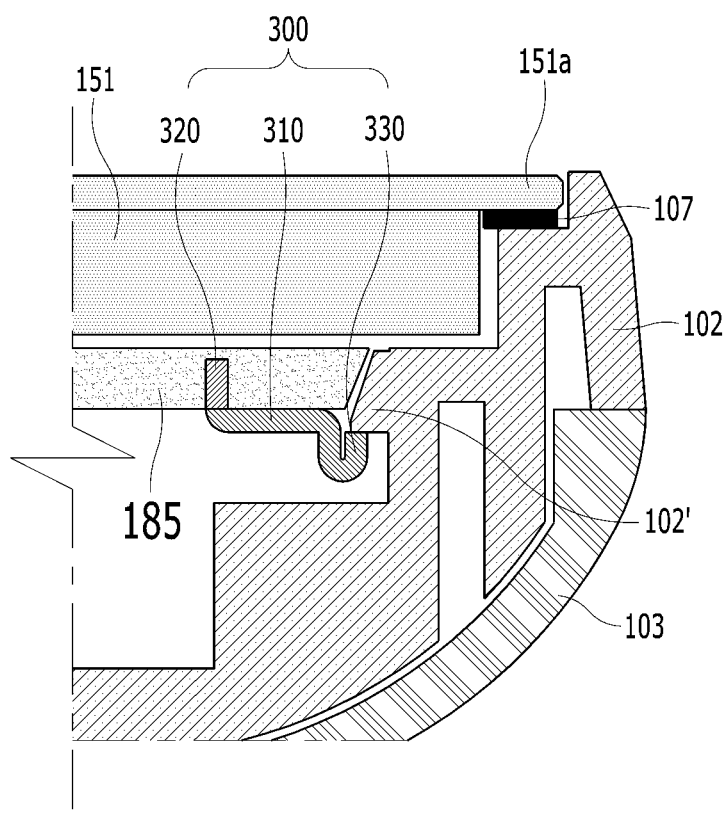
FIG. 17 is a cross-sectional view illustrating the mobile terminal related to the present invention.

FIG. 17 is a cross-sectional view illustrating the mobile terminal 100 related to the present invention, and illustrates another embodiment of the hook 300. In this embodiment, the protrusion 330 of the hook 300 may be located toward a rear side from the rear surface of the main board 185, or may be located in a front direction from the rear surface of the main board 185. The height of the protrusion 330 of the hook 300 may be controlled depending on whether the fastening protrusion 102' is located in a rear direction or front direction of the main board 185.

Figure 18:
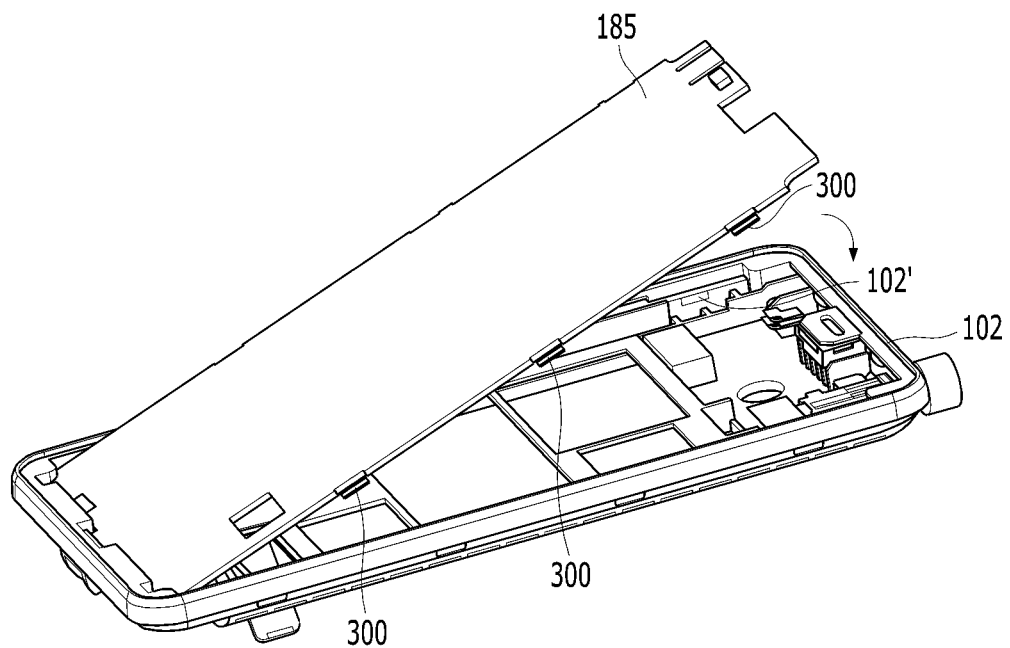
FIG. 18 is a view illustrating a method for coupling a case and a main board of the mobile terminal related to the present invention to each other.

FIG. 18 is a view illustrating a method for coupling a case 102 and a main board 185 of the mobile terminal 100 related to the present invention to each other. If the main board 185 is pushed from a front direction to a direction of the case 102, since the case 102 is an injection-molding member, the case 102 is spaced toward a side direction, whereby the hook 300 is coupled to the fastening protrusion 102'.

If the fastening protrusion 102' has an inclined surface inclined in an inner direction as shown in FIG. 16, the hook 300 may easily be inserted along the inclined surface. At this time, if the side of the fastening protrusion 102' and the side of the main board 185, which faces the fastening protrusion 102', have inclined surfaces of corresponding shapes, the spaced portion between the main board 185 and the case 102 may be reduced as shown in FIG. 11, and the main board 185 may be prevented from being drooped down.

Meanwhile, the mobile terminal 100 may include a waterproof sealing 350 on the rear surface of the case 102 as shown in FIG. 10 so as not to prevent water from being permeated into the body of the mobile terminal. The ring comprised of an elastic member is arranged in the periphery of the portion where the opening is formed and is coupled with the rear cover. Then, the waterproof sealing 350 is pushed to prevent water from being permeated into the waterproof sealing 350.

As described above, according to one embodiment of the present invention, the ear jack 200 structure is provided outside the case 102, whereby water may be prevented from being permeated into case 102 through the ear jack 200. Also, the waterproof ear jack 200 may be used, or the existing antenna carrier 250 may be used without a separate sealing member for waterproof of the ear jack 200, whereby the cost may be reduced.

Also, since the fastening structure based on a screw may be omitted as the hook 300 structure is used, the cost may be reduced and additional waterproof member may not be required additionally in view of waterproof.

Also, the front case 102 is omitted, and the front surface is provided by the display unit 151 and a cover glass only, whereby the number of members can be reduced and a thickness of the product can be reduced.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the specification are included in the scope of the invention.

The invention claimed is:

1. A mobile terminal comprising:
a case including a packaging portion recessed in a rear direction on a front surface;
a fastening protrusion protruded from a side of the packaging portion toward an inner direction;
a main board coupled to the front surface of the case;
a hook coupled to a circumference of a rear surface of the main board and protruded from a side end of the main board; and
a display unit arranged on a front surface of the main board and coupled to a circumference of the case,
wherein the hook includes:
a seating portion which is in contact with the circumference of the rear surface of the main board;
a fastening portion extended from the seating portion to a front direction and inserted to the main board; and
a protrusion extended from the seating portion toward a side direction of the main board and protruded from the main board, and
wherein the main board couples with the case by the protrusion of the hook contacting with a rear surface of the fastening protrusion.

2. The mobile terminal according to claim 1, wherein the hook is fastened to the main board by a manner of surface mounter technology (SMT).

3. The mobile terminal according to claim 1, wherein the protrusion is a U shaped metal plate material extended from the seating portion toward a rear direction, having an end folded toward a front surface.

4. The mobile terminal according to claim 3, wherein the protrusion has a height different from that of the rear surface of the main board.

5. The mobile terminal according to claim 1, wherein the hook is formed by folding a cross shaped metal plate material.

6. The mobile terminal according to claim 1, wherein the main board includes a recess inserted from a side end at a width corresponding to that of the fastening protrusion at a position corresponding to the hook, and the fastening protrusion is inserted to the recess and is fastened to the hook.

7. The mobile terminal according to claim 1, further comprising:
a battery packaged in a rear surface of the case; and
a rear cover covering the battery, coupled to the rear surface of the case.

8. The mobile terminal according to claim 1, further comprising a waterproof sealing formed on a circumference of the rear surface of the case, constituting a closed curved surface.

9. The mobile terminal according to claim 1, further comprising a waterproof tape interposed between a circumference of a rear surface of the display unit and a circumference of a front surface of the case.

10. A mobile terminal comprising:
a case having an electric mounting portion with electronic components packaged therein and having an ear jack holder on the outer surface thereof;
an ear jack coupled to the ear jack holder, having a plug hole into which a connection plug is inserted;
a plurality of first terminals provided inside the plug hole;
a second terminal connected to the first terminals and exposed to the outside of the ear jack;
an antenna carrier coupled to a rear surface of the case, having an antenna pattern formed on the surface thereof; and an ear jack electrode pattern formed in the antenna carrier, having one end which is in contact with the second terminal.

11. The mobile terminal according to claim 10, wherein the second terminal of the ear jack is located in a side direction of the ear jack, the antenna carrier further includes an ear jack rib protruded from an inner side, passing through an opening of the case, and one end of the ear jack electrode pattern is formed at the ear jack rib and is in contact with the second terminal.

12. The mobile terminal according to claim 10, further comprising a waterproof tape interposed between the antenna carrier and the case.

13. The mobile terminal according to claim 10, further comprising a connection rib protruded from the inner side of the antenna carrier and extended to a main board, which is located inside the case, by passing through the case, wherein the ear jack electrode pattern is extended to the connection rib and electrically connected with the main board.

14. The mobile terminal according to claim 10, wherein the antenna pattern and the ear jack electrode pattern are formed at the inner side of the antenna carrier.

15. The mobile terminal according to claim 10, wherein the ear jack holder further includes an ear jack fixing portion partially covering a rear surface of the ear jack.

16. The mobile terminal according to claim 10, wherein the antenna carrier includes an ear jack hole for exposing the plug hole of the ear jack.

\* \* \* \* \*